US012769021B2

(12) United States Patent
Ristigian

(10) Patent No.: US 12,769,021 B2
(45) Date of Patent: Oct. 20, 2026

(54) STUD LOCATOR DEVICE WITH INTEGRATED PENCIL MARKER

(71) Applicant: Nicholas Ristigian, Phoenix, AZ (US)

(72) Inventor: Nicholas Ristigian, Phoenix, AZ (US)

(*) Notice: Subject to any disclaimer, the term of this patent is extended or adjusted under 35 U.S.C. 154(b) by 137 days.

(21) Appl. No.: 18/664,444

(22) Filed: May 15, 2024

(65) Prior Publication Data

US 2024/0402375 A1 Dec. 5, 2024

Related U.S. Application Data

(60) Provisional application No. 63/505,187, filed on May 31, 2023.

(51) Int. Cl.
*G01V 3/08* (2006.01)
*B25H 7/04* (2006.01)

(52) U.S. Cl.
CPC *G01V 3/08* (2013.01); *B25H 7/04* (2013.01)

(58) Field of Classification Search
CPC ........ G01N 27/72; G01N 27/82; G01R 33/00; G01R 33/0035; G01R 33/0047; G01R 33/0322; G01R 33/0327; G01R 33/10; G01R 33/1284
See application file for complete search history.

(56) References Cited

U.S. PATENT DOCUMENTS

| | | | | |
|---|---|---|---|---|
| 4,700,489 | A * | 10/1987 | Vasile | G01B 3/566 324/67 |
| 6,674,276 | B2 | 1/2004 | Morgan | |
| 6,747,536 | B1 | 6/2004 | Miller, Jr. | |
| 7,013,570 | B2 * | 3/2006 | Levine | G01V 3/15 324/67 |
| 7,161,343 | B1 | 1/2007 | Biary | |
| 7,437,830 | B1 | 10/2008 | Kulavic | |
| 7,570,041 | B2 * | 8/2009 | Latraverse | G01B 7/06 324/67 |
| 7,690,124 | B1 | 4/2010 | Henry | |
| 11,385,375 | B2 | 7/2022 | Guerrero, Sr. | |

* cited by examiner

*Primary Examiner* — Tung X Nguyen
(74) *Attorney, Agent, or Firm* — Brennan, Manna & Diamond, LLC

(57) ABSTRACT

A stud finder device which includes an integrated marking mechanism to enhance ease and accuracy in locating and marking studs within walls is disclosed. The device comprises a substantially planar main body equipped with a magnetic sensor for detecting metal fasteners. A two-pronged trigger-activated (i.e., actuated) pencil assembly includes a pair of pencils for marking the wall and is embedded within the device thereby enabling for hands-free marking directly at the detected stud locations. The assembly is actuated using a trigger disposed on a handle wherein the handle is coupled to the main body. The main body is maneuverable along a wall surface, facilitated by a pair of wheels and the handle that enables users to operate the device comfortably from a standing position. Stud indication markers are positioned across the front and rear surfaces of the main body and signal the presence of studs.

19 Claims, 9 Drawing Sheets

STUD LOCATOR DEVICE WITH INTEGRATED PENCIL MARKER

CROSS-REFERENCE TO RELATED APPLICATION

The present application claims priority to, and the benefit of, U.S. Provisional Application No. 63/505,187, which was filed on May 31, 2023 and is incorporated herein by reference in its entirety.

FIELD OF THE INVENTION

The present invention generally relates to the field of stud locator devices. More specifically, the present invention relates to a stud locator with the added feature to mark the wall where the center of the stud exists. The stud finder works using magnetic detection and LED lighting to visually identify the center of the stud and has the added feature of a two-pronged trigger activated (i.e., actuated) pencil assembly to mark the wall with the same hand that holds the stud finder. The trigger attachment can attach or detach from the device. Accordingly, the present disclosure makes specific reference thereto. Nonetheless, it is to be appreciated that aspects of the present invention are also equally applicable to other like applications, devices, and methods of manufacture.

BACKGROUND

By way of background, locating studs behind the walls is a fundamental part of many home improvement projects. For example, individuals may look for studs while installing baseboards, crown moulding, and flooring; anchoring wall cabinets; and/or mounting shelving units. Also, individuals may locate studs when they want to hang some heavy item on the wall, as the item is to be hung on the center of the stud. Additionally, individuals may find studs while running plumbing pipes or electrical cables as individuals may avoid drilling into the stud to prevent damage to structural integrity of the wall. Once the wall structure is weakened due to unnecessary and inappropriate drilling, it cannot be reversed. Therefore, individuals make it a priority to find studs before starting on any home improvement tasks.

Various kinds of stud detection devices such as Magnetic stud finders, electronic stud finders, radio frequency (RF) imagers, ultra-wide-band (UWB) wall scanners, etc. are available in the market, that are widely used by individuals to get an accurate view into the wall and find the exact location of the studs behind the walls.

Once a stud is located, it needs to be manually marked using a pencil or a marker to subsequently use the exact stud position for hanging items, installing cables/flooring/baseboards/crown moulding, or the like. Manual stud marking can be a tedious and exhausting task even for professional contractors. Individuals may find it too difficult to mark the stud location with pencil/marker using one hand while holding the stud detector in another hand. Since both the hands are utilized while locating and marking studs behind drywalls, individuals may require assistance from others in case they need to perform some other tasks at the same time.

Further, during floor and baseboard installation, individuals may have to go onto their hands and knees to locate the studs and mark it close to the ground, that leads to severe aches and pains in back, knees, and neck. Also, individuals with limited physical dexterity may be unable to mark the studs using traditional methods. Furthermore, since the stud location marking process is manual, there is a huge chance of making errors due to lack of focus as individuals are busy locating studs and marking studs at the same time, that can lead to drilling at wrong stud position and therefore weakening the wall structure.

Therefore, there exists a long felt need in the art for a device that enables the individuals to precisely locate the studs behind the drywall and use its location while installing flooring and baseboards, crown moulding, running plumbing pipes, electrical cables, hanging items, installing shelves or while performing any other home improvement tasks. There is also a long felt need in the art for a stud marker device that enables the users to easily and accurately mark the stud location. Additionally, there is a long felt need in the art for a stud locator and marker device that enables easy marking of exact stud location without going onto knees or hands and therefore prevents any injuries/pain in hands, knees, or neck. Moreover, there is a long felt need in the art for a stud marker device that can be easily used by individuals with limited physical dexterity. Further, there is a long felt need in the art for a stud locator device that ensures only one hand is used while detecting stud location and marking their position and enables the users to use their other hand for any other tasks to be done at the same time. Finally, there is a long felt need in the art for a simple and convenient stud locator and marker device for contractors, homeowners, or more.

The subject matter disclosed and claimed herein, in one embodiment thereof, comprises a stud finder device with integrated pencil markers. The device comprises a main body that is substantially planar and configured for adherence to a wall surface, the main body having a front surface, a rear surface, a top edge, a bottom edge, and a pair of side edges. A plurality of stud indication markers are arrayed equidistantly along the top edge and across both the front and rear surfaces of the main body and are designed to be visible from both sides to indicate the presence of a stud. A magnetic sensor is integrated within the main body for detecting metal fasteners within the wall, thereby locating studs behind the drywall. A two-pronged trigger-activated (i.e., actuated) pencil assembly is incorporated into the rear surface of the main body for marking the wall upon detection of a stud, comprising a first and a second movable graphite pencil assembly marker, each capable of extending a graphite pencil for marking when a trigger disposed on a handle is pressed by a user.

In this manner, the stud locator device of the present invention accomplishes all of the forgoing objectives and provides users with an enhanced device of locating and marking studs within walls. The device has integrated magnetic sensor which precisely detects the metal fasteners used in securing drywall to studs. The two-pronged trigger-activated (i.e., actuated) pencil assembly eliminates the need for a separate pencil or marking tool. The device includes a pivotable handle and a pair of wheels for easy maneuverability along a wall, thereby enabling operation from a comfortable standing position. The device enables users to operate the device from a standing position and eliminates the need for additional tools while marking.

SUMMARY OF THE INVENTION

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a stud finder device. The stud finder device includes a main body that is substantially planar, having a front surface, a rear surface, a top edge, a bottom edge, and a pair of side edges. A pair of wheels are disposed on the bottom edge of the main body, facilitating lateral movement along a wall. A magnetic sensor is disposed within the main body for detecting metal fasteners, indicating the presence of a stud. A plurality of stud indication markers are positioned equidistant along the top edge and across the front and rear surfaces of the main body, wherein the indication of a stud by the magnetic sensor is conveyed by the stud indication markers, and a two-pronged trigger-activated (i.e., actuated) pencil assembly is embedded to the rear surface of the main body for marking on a wall upon identification of a stud. The two-pronged trigger-activated (i.e., actuated) pencil assembly includes first and second movable graphite pencil assembly markers, each adapted to accommodate a graphite pencil for marking on a wall, wherein the markers are operatively connected to the trigger mechanism enabling for selective marking based on the detection of studs.

In yet another embodiment, a pivotable extended and telescoping handle is secured to the main body for facilitating easy maneuvering of the device along a wall, wherein the handle includes a hand member for gripping the handle and a trigger is adapted to activate the pencil assembly for marking the position of a stud on a wall.

In another aspect, the two-pronged trigger-activated (i.e., actuated) pencil assembly is embedded within the device and includes a first movable graphite pencil assembly marker and a second movable graphite pencil assembly marker, each designed to accommodate a graphite pencil for marking on a wall. A trigger mechanism is operatively connected to the pencil assembly markers, wherein the trigger mechanism is configured to selectively extend or retract the graphite pencils from their respective assembly markers. A pneumatic rod is coupled to the trigger, wherein the rod actuates a spring and lever combination upon the trigger's activation, the spring and lever combination is operatively connected to both the first and second movable graphite pencil assembly markers to facilitate the extension and retraction of the graphite pencils.

In yet another embodiment, pressing the trigger extends the graphite pencils from the assembly markers to mark on a wall, and upon release, retracts the pencils into the assembly markers, facilitating clean and precise marking without manual adjustment.

In a further embodiment, the magnetic sensor can display the center and edges of studs simultaneously on the stud indication markers, accommodating for single studs, double studs, and irregular configurations of studs within a wall.

Numerous benefits and advantages of this invention will become apparent to those skilled in the art to which it pertains upon reading and understanding of the following detailed specification.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION OF THE PRESENT INVENTION

Figure 1:
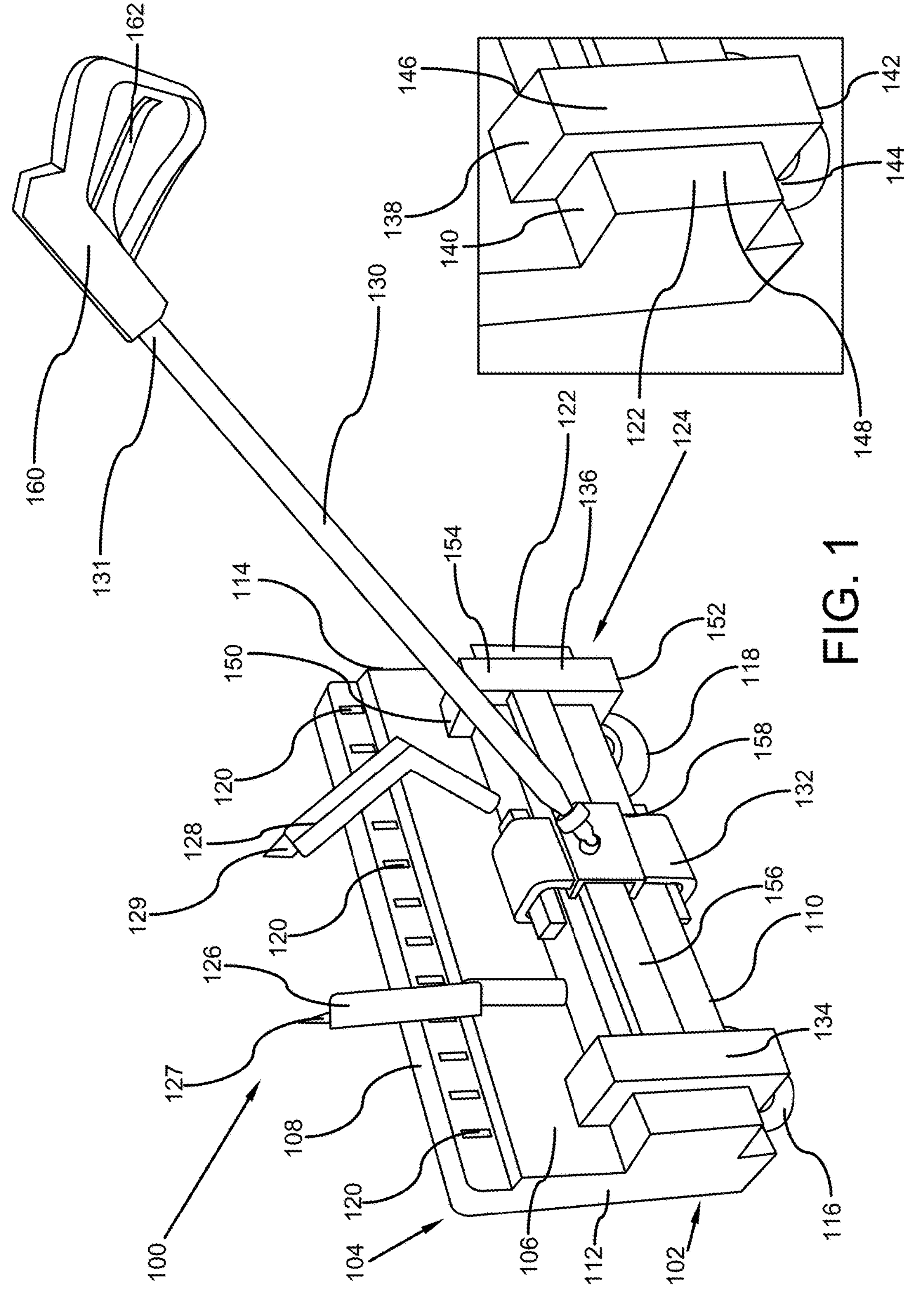
FIG. 1 illustrates a perspective view of the stud wall marker integrated stud finder device of the present invention in accordance with the disclosed structure.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long felt need in the art for a device that enables the individuals to precisely locate the studs behind the drywalls and use its location while installing flooring and baseboards, crown moulding, running plumbing pipes, electrical cables, hanging items, installing shelves, and/or while performing any other home improvement tasks. There is also a long felt need in the art for a stud marker device that enables the users to easily and accurately mark the stud location. Additionally, there is a long felt need in the art for a stud locator and marker device that enables easy marking of exact stud location without going onto knees or hands and therefore prevents any injuries/pain to the hands, knees, or neck. Moreover, there is a long felt need in the art for a stud marker device that can be easily used by individuals with limited physical dexterity. Further, there is a long felt need in the art for a stud locator device that ensures only one hand is used while detecting stud location and marking their position and enables the users to use their other hand for any other tasks to be done at the same time. Finally, there is a long felt need in the art for a simple and convenient stud locator and marker device for contractors, homeowners, or more.

The present invention, in one exemplary embodiment, is a stud finder device. The stud finder device includes a main body. A pair of wheels are disposed on the bottom edge of the main body, facilitating lateral movement along a wall. A magnetic sensor is disposed within the main body for detecting metal fasteners, indicating the presence of a stud. A plurality of stud indication markers are positioned equidistant along the top edge and across the front and rear surfaces of the main body, wherein the indication of a stud by the magnetic sensor is conveyed by the stud indication markers. A two-pronged trigger-activated (i.e., actuated) pencil assembly is embedded to the rear surface of the main body for marking on a wall upon identification of a stud. The two-pronged trigger-activated (i.e., actuated) pencil assembly includes first and second movable graphite pencil assembly markers, each adapted to accommodate a graphite pencil for marking on a wall, wherein the markers are operatively connected to the trigger mechanism enabling for selective marking based on the detection of studs.

Referring initially to the drawings, FIG. 1 illustrates a perspective view of the stud wall marker integrated stud finder device of the present invention in accordance with the disclosed structure. The stud wall marker integrated stud finder device 100 of the present invention is designed as an advanced stud finder tool designed to enhance the case and accuracy of locating studs within walls. The stud finder device 100 enables users to directly mark the wall at the precise location of the stud's center without holding a pencil separately in one hand. The stud finder device 100 eliminates kneeling and bending by a user to mark studs in a wall by offering to mark studs in a hands-free manner. More specifically, the stud wall marker integrated stud finder device 100 is a portable device and includes a main body 102 which is substantially planar and has a front surface 104 and a rear surface 106. The main body 102 is preferably square or rectangular and the front surface 104 can adhere to surface of a wall.

The main body 102 is defined by a top edge 108, a bottom edge 110, and a pair of side edges 112, 114. A pair of wheels 116, 118 are disposed on the bottom edge 110 and the pair of wheels 116, 118 are configured to laterally move along the length of the bottom edge 110 facilitating movement of the stud finder device 100 along a wall. The main body 102 includes a plurality of stud indication markers 120 (only some are marked for clarity), wherein the stud indication markers 120 are positioned equidistant along the top edge 108 and across the front surface 104 and the rear surface 106. The stud indication markers 120 are visible from both the front surface 104 and the rear surface 106 of the main body 102.

The main body 102 includes a magnetic sensor disposed therein to locate nails or screws used to secure the drywall to the studs. The magnetic sensor is adapted to detect the pull of the magnet on the metal fasteners, indicating the location of a stud and the location of the stud is indicated by the stud indication markers 120. The device 100 can display the center and edges of studs simultaneously, showing single studs, double studs, and irregular configurations.

A protruding wall 122 is embedded to the rear surface 106 of the main body 102 and is adapted to accommodate a trigger mechanism as described later in the disclosure for triggering a two-pronged trigger activated (i.e., actuated) pencil assembly 124. The two-pronged trigger activated (i.e., actuated) pencil assembly 124 includes a first movable graphite pencil assembly marker 126 and a second movable graphite pencil assembly marker 128. The markers 126, 128 are adapted to accommodate a graphite pencil 127, 129 each for marking on the wall when a stud is identified by the device 100, thereby eliminating holding a pencil in hand for marking a stud.

A pivotable extended and telescoping handle 130 is secured to the protruding wall 122 using an attachment assembly 132. The attachment assembly 132 can be detachably attached to the main housing 102 and has a first groove member 134 and an opposite (i.e., opposing) second groove member 136, the groove members 134, 136 are secured to the protruding wall 122. The structure and design of the groove members 134, 136 are symmetrical and the first groove member 134 includes a first transversal member 138 adhering (i.e., affixing) to the top edge 140 of the protruding wall 122, a second transversal member 142 adhering (i.e., affixing) to the bottom edge 144 of the protruding wall 122 and a connecting member 146 connected to the transversal members 138, 142 adheres to the planar surface 148 of the protruding wall 122. The other groove member 136 has the similar transversal members 150, 152 and the connecting member 154. An elongated securing arm 156 extends between the groove members 134, 136 and through a hollow attachment member 158. The handle 130 is integrated to the hollow attachment member 158 for providing movement of the device 100 laterally along a wall.

The top end 131 of the handle 130 includes a hand member 160 for enabling a user to grip the handle 130 easily and securely. The hand member 160 includes a trigger 162 which is adapted to activate the two-pronged trigger activated (i.e., actuated) pencil assembly 124 for marking the position of a stud on a wall using the accommodated graphite pencils. The handle 130 with the integrated trigger 162 for the pencil markers 126, 128 enables users to comfortably operate the device 100 from a standing position, making it easier to mark spots on the wall without the need for step stools or ladders for crown moulding installation and without bending or kneeling for the baseboard installation.

Figure 2:
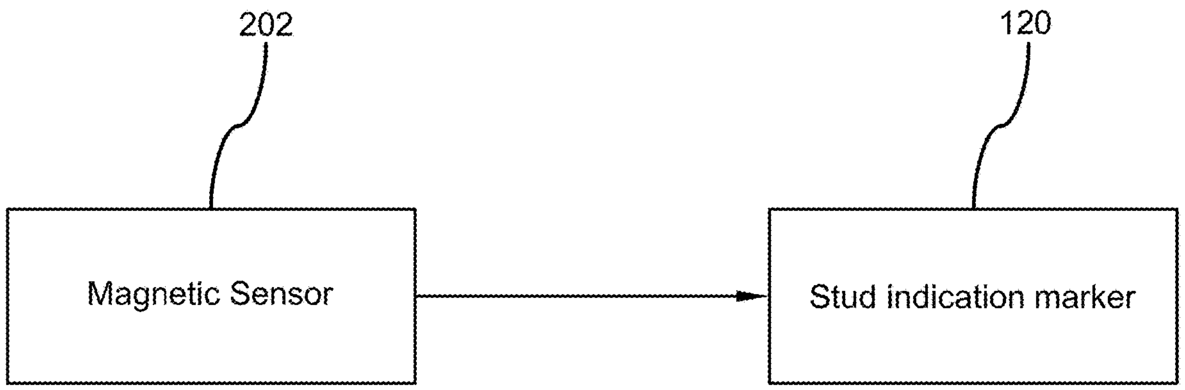
FIG. 2 illustrates a functional block diagram depicting operation of the magnetic sensor along with the stud indication markers in accordance with one embodiment of the present invention.

FIG. 2 illustrates a functional block diagram depicting operation of the magnetic sensor along with the stud indication markers in accordance with one embodiment of the present invention. The stud finder with integrated pencil markers 100 has a magnetic sensor 202 corresponding to each stud indication marker wherein the magnetic sensor 202 is installed within the main body 102 of the device 100. Each magnetic sensor 202 is configured to detect the metal fasteners (like nails or screws) used to secure the drywall to the studs. When a metal fastener is detected, the magnetic sensor 202 illuminates the corresponding stud indication marker 120 for indicating presence of a stud. The device 100 is adapted to display the edges of a stud and center of the stud by preferably illuminating three stud indication markers simultaneously.

The stud indication markers 120 provide a visual indication of presence of a stud and accordingly, the trigger 162 can be manually triggered by a user to actuate the two-pronged trigger activated (i.e., actuated) pencil assembly 124 to mark points on a wall. The handle 130 enables the user to easily maneuver the device 100 along the bottom of a wall and at any height to locate points for location of a stud easily and safely.

Figure 3:
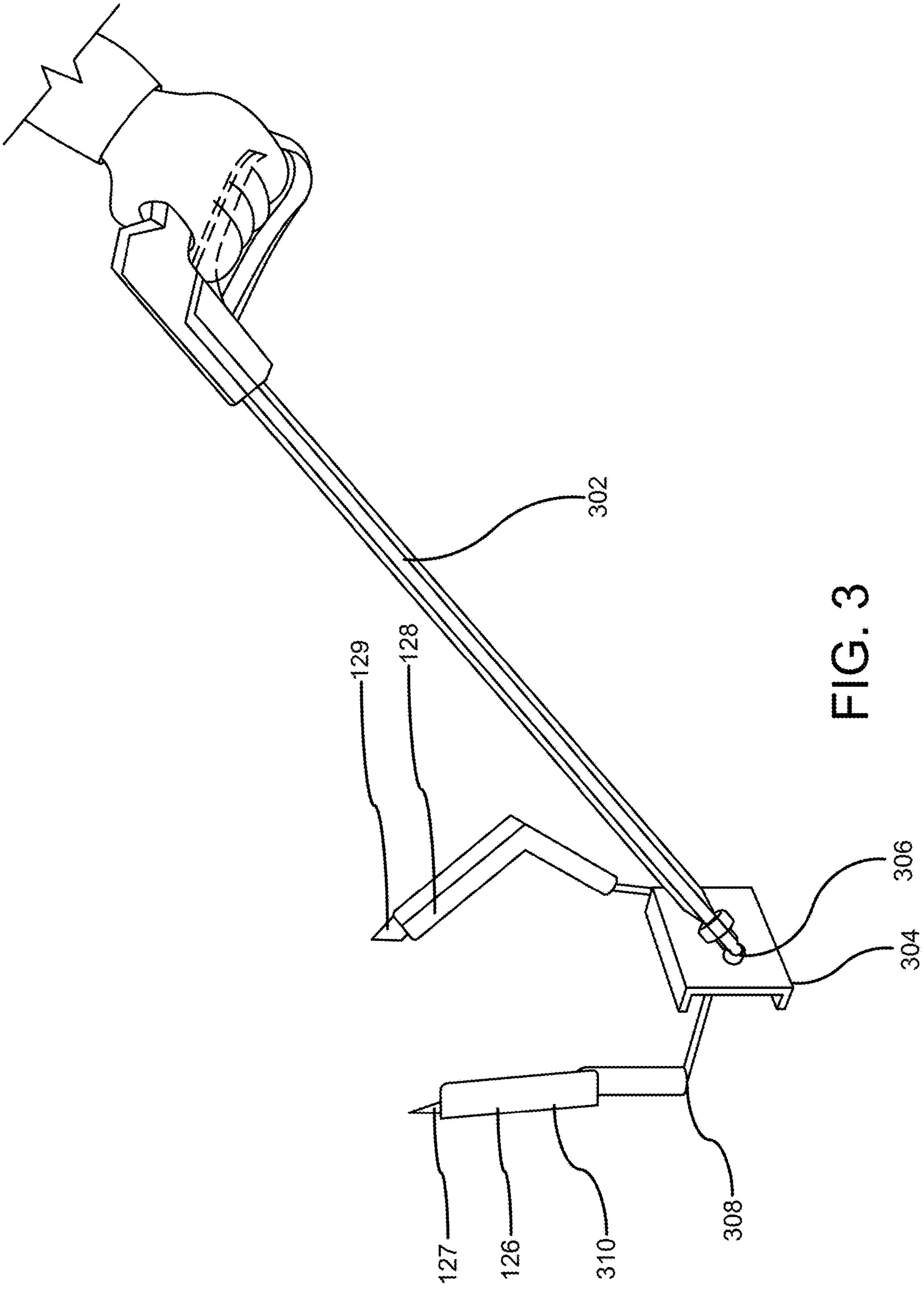
FIG. 3 illustrates an internal view of the handle and the main body of the stud finder device showing the triggering of the two-pronged trigger activated (i.e., actuated) pencil assembly using the trigger in accordance with one embodiment of the present invention.

FIG. 3 illustrates an internal view of the handle and the main body of the stud finder with integrated pencil markers showing the triggering of the two-pronged trigger activated (i.e., actuated) pencil assembly using the trigger in accordance with one embodiment of the present invention. The trigger 162 is coupled to a pneumatic rod 302 and the rod 302 is disposed inside the handle 130. The rod 302 is attached to a spring and lever combination 304 disposed at the bottom end 306 of the rod 302. The spring and lever combination 304 is connected to the bottom end 308 of the upper member 310 of the first movable graphite pencil assembly marker 126. It should be noted that the spring and lever combination 304 is also connected to the bottom end of the upper member of the second movable graphite pencil assembly marker 128. When the trigger 162 is activated, the graphite pencils 127, 129 are pushed outside from the markers 126, 128 to mark on wall or any other surface. When the trigger 162 is released, the pencils are pulled back inside the corresponding markers 126, 128, thereby enabling selective marking on a wall. So, when LEDs are illuminated, the trigger 162 can be pushed and marks can be easily made on any surface such as a wall.

Figure 4:
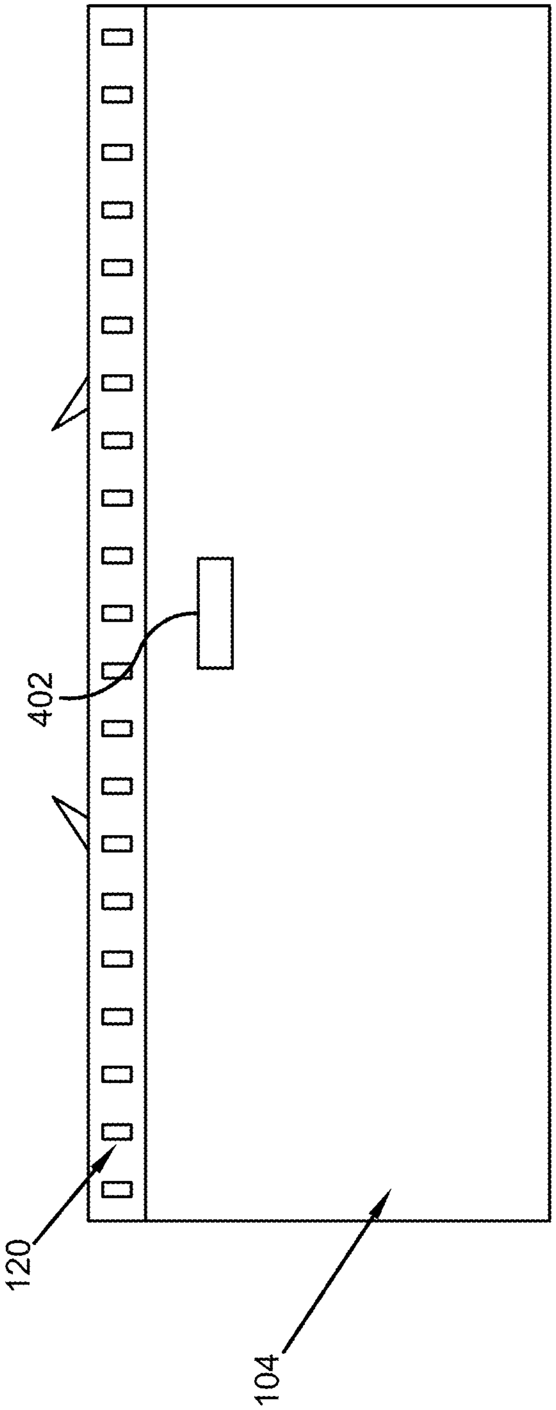
FIG. 4 illustrates a front perspective view of the stud finder device of the present invention in accordance with the disclosed structure.

FIG. 4 illustrates a front perspective view of the stud finder device of the present invention in accordance with the disclosed structure. The front surface 104 includes a power button 402 to activate and deactivate the device 100. The stud indication markers 120 are accessible from the front surface 104 as well and the front surface 104 is planar for adhering (i.e., affixing) to any planar surface such as a wall.

Figure 5:
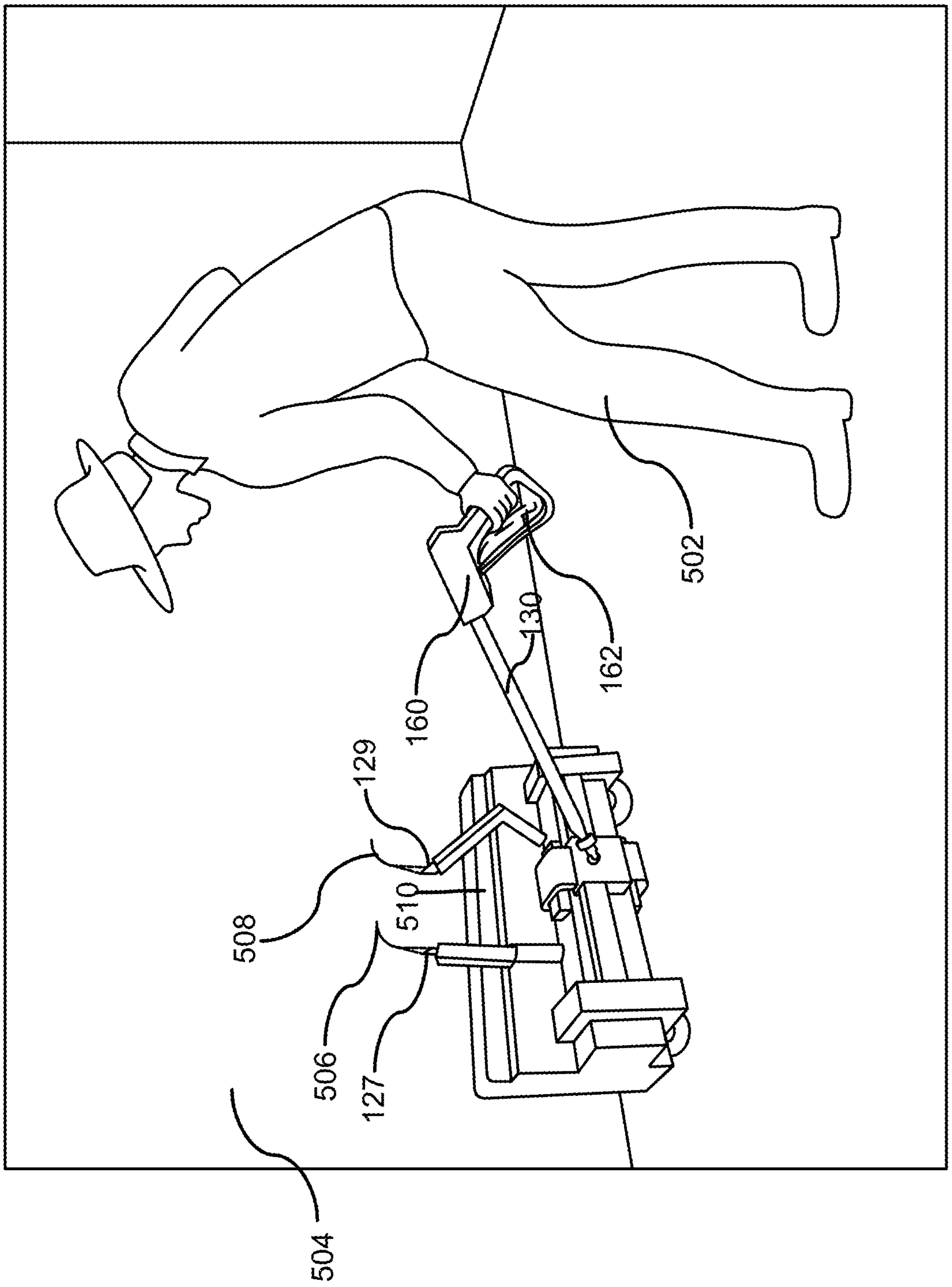
FIG. 5 illustrates a perspective view showing a user using the stud wall marker integrated stud finder device of FIG. 1 in accordance with the disclosed structure.

FIG. 5 illustrates a perspective view showing a user using the stud wall marker integrated stud finder device of FIG. 1 in accordance with the disclosed structure. As illustrated, a user 502 can stand in a normal position and holds the handle 130 at the top end 131 thereof. The hand member 160 provides an ergonomic and stable grip of the handle 130. For identifying a stud within a wall, the device 100 is moved using the handle 130 along the wall 504 and when LEDs 510 positioned between the markers are illuminated indicating presence of a stud, the trigger 162 is pressed by the user to extend the pencils out of the markers 126, 128 to mark points 506, 508 on the wall 504. It should be noted that the user 502 does not have to hold a pencil in hand or kneel, or bend to make marks on the wall 504.

Figure 6:
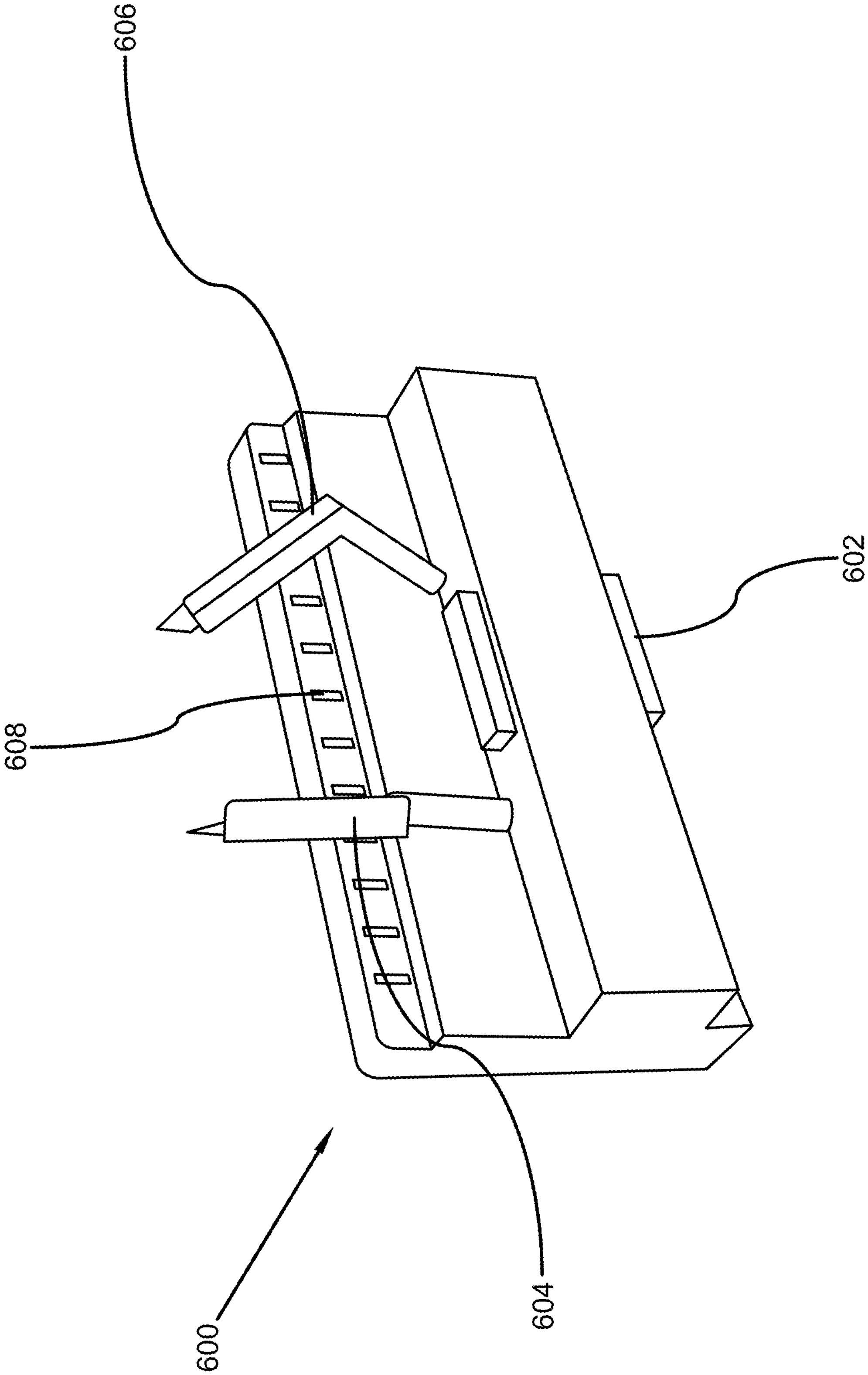
FIG. 6 illustrates a handheld version of the stud wall marker integrated stud finder device of the present invention in accordance with the disclosed structure.

FIG. 6 illustrates a handheld version of the stud wall marker integrated stud finder device of the present invention in accordance with the disclosed structure. In the present invention, the device 600 is adapted to use for marking purposes at a height on a wall. The device 600 does not include a handle and can be held in a hand by a user. The push button 602 is pushed by a user to extend the markers (i.e., pencils) 604, 606. The stud indication markers 608 provide a visual indication of presence of a stud and accordingly, the trigger can be manually triggered by a user to actuate the two-pronged trigger activated (i.e., actuated) pencil assembly 604, 606 to mark points on a wall.

It is to be appreciated that for marking stud locations for installing crown moulding, the user first needs to climb a ladder to mark an initial stud, the user then needs to climb down the ladder, move the ladder to the proximate location for the adjacent stud, and repeat this process for each and every stud, which can be time consuming, tiring, and unsafe. When installing crown moulding, the user repeats the above process, albeit with a nail gun, to mount the crown moulding to the wall and/or ceiling, thereby duplicating the movements and handling of the ladder.

Figure 7:
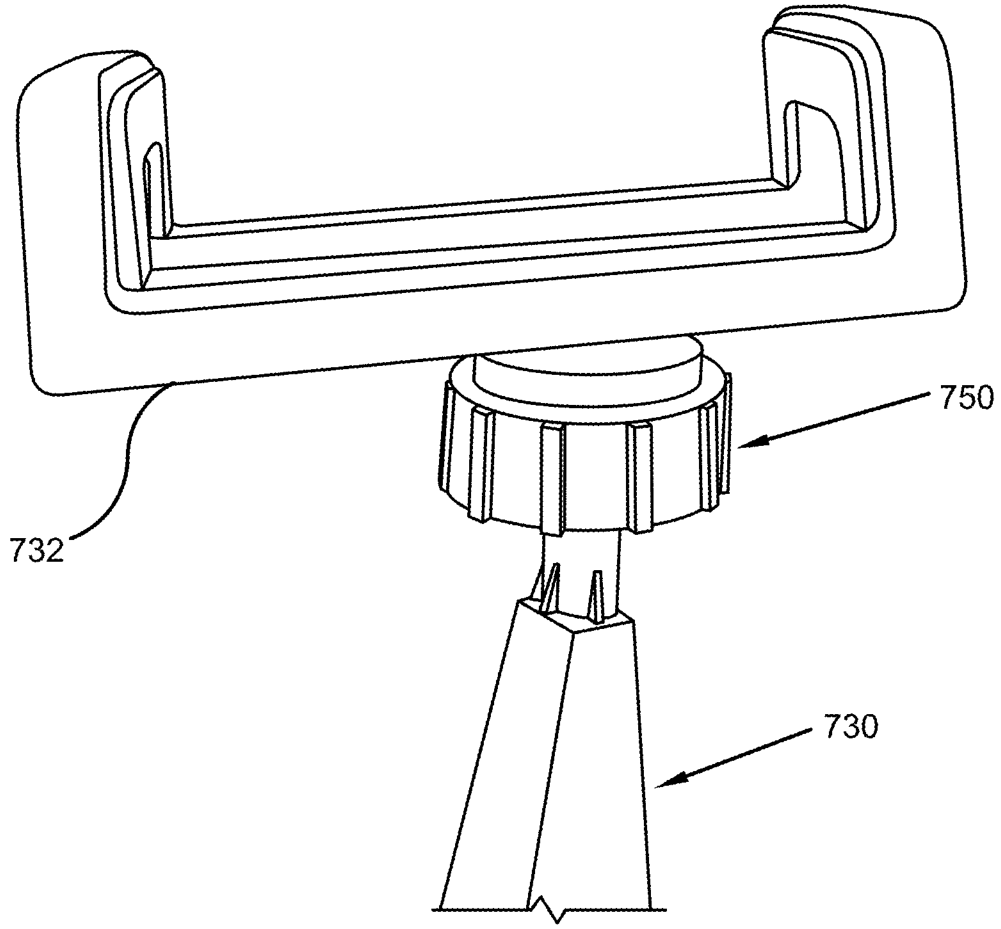
FIGS. 7-9 illustrate an enlarged view of another embodiment of a mounting configuration of the handle to an attachment assembly.
Figure 8:
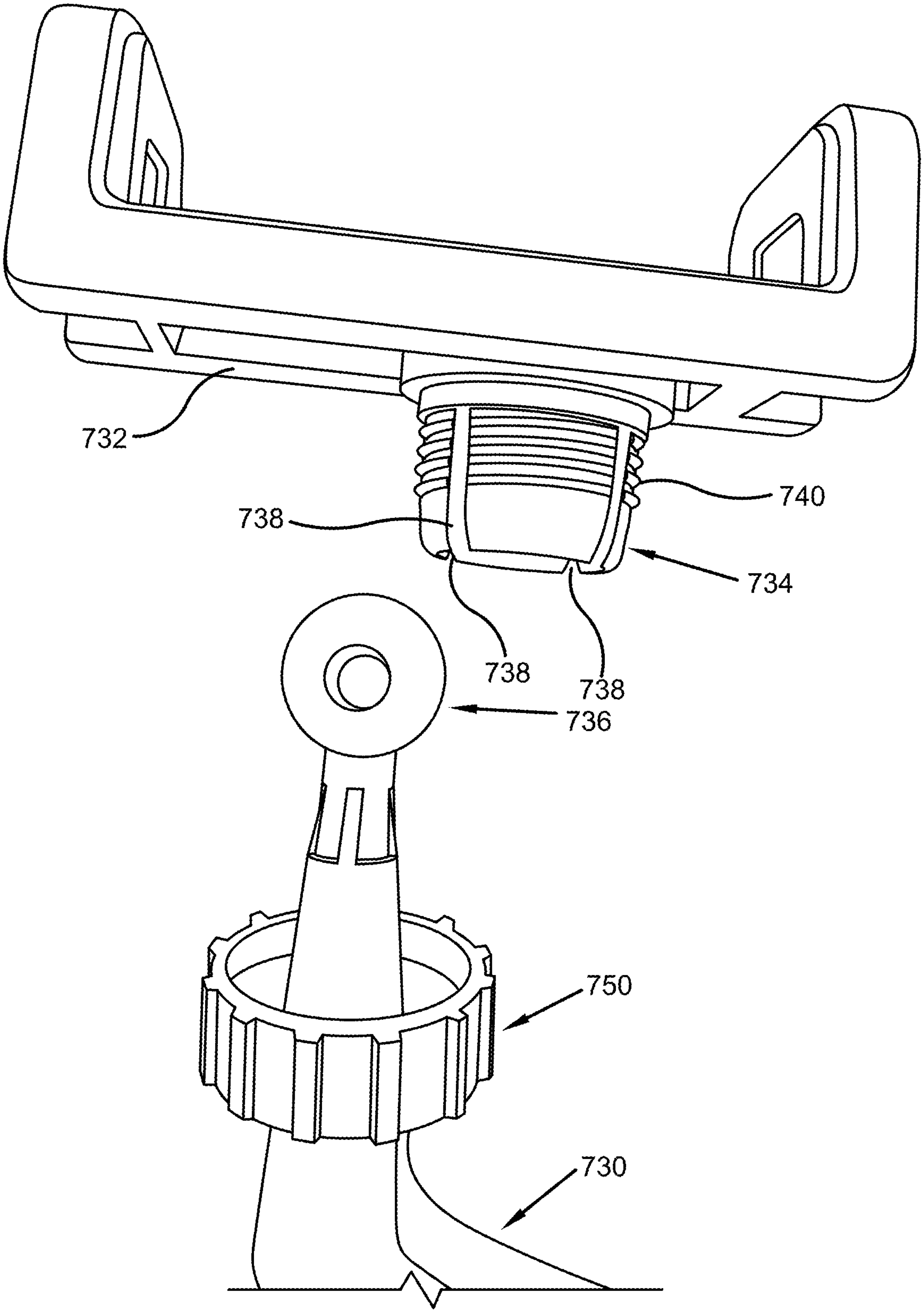
Figure 9:
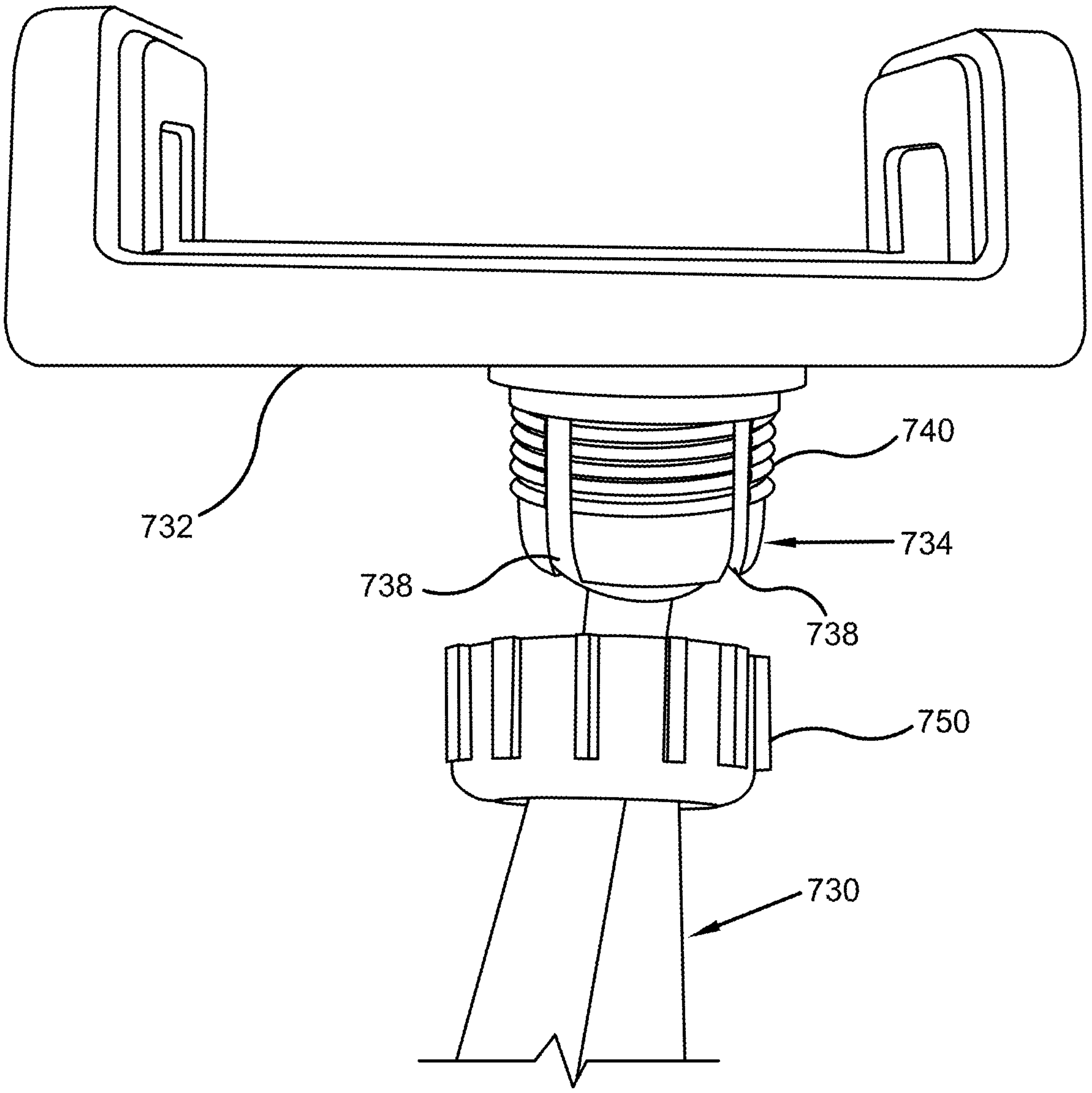

Referring now to FIGS. 7-9, another embodiment of a pivotable handle 730 is secured to an attachment assembly 732. The attachment assembly 732 can be detachably attached to the main housing and includes a mounting socket 734 for receiving a corresponding ball 736 at a terminal end of the handle 730. The socket 734 includes a plurality of slits 738 therethrough transverse to a plurality of threads 740 circumscribing the socket 734. A securing nut 750 is used for mating with the threads 740 of socket 734. Upon insertion of ball 736 into socket 734, the nut 750 can be threaded onto the socket 734 and secured to retain the ball 736 in the socket 734 while still enabling pivotal movement of the ball 736 within the socket 734.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein “stud wall marker integrated stud finder device”, “stud finder device”, “adjustable stud finder device”, “stud finder with integrated pencil markers”, and “device” are interchangeable and refer to the stud wall marker integrated stud finder device 100, 600 of the present invention.

Notwithstanding the forgoing, the stud wall marker integrated stud finder device 100, 600 of the present invention can be of any suitable size and configuration as is known in the art without affecting the overall concept of the invention, provided that it accomplishes the above stated objectives. One of ordinary skill in the art will appreciate that the stud wall marker integrated stud finder device 100, 600 as shown in the FIGS. are for illustrative purposes only, and that many other sizes and shapes of the stud wall marker integrated stud finder device 100, 600 are well within the scope of the present disclosure. Although the dimensions of the stud wall marker integrated stud finder device 100, 600 are important design parameters for user convenience, the stud wall marker integrated stud finder device 100, 600 may be of any size that ensures optimal performance during use and/or that suits the user’s needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term “includes” is used in either the detailed description or the claims, such term is intended to be inclusive in a manner similar to the term "comprising" as "comprising" is interpreted when employed as a transitional word in a claim.

What is claimed is:

1. A stud finder device comprising:
a stud finder body;
a plurality of wheels;
a plurality of stud indication markers;
a magnetic sensor;
a magnet; and
an attachment device;
wherein said stud finder body having a top edge, a bottom edge, a pair of side edges, a front surface, and a rear surface;
wherein said plurality of stud indication markers are positioned equidistant along said top edge and across said front surface and said rear surface;
wherein said rear surface having a protruding wall;
wherein said attachment device selectively detachable from said stud finder body; and
further wherein said stud indication markers are visible from both said front surface and said rear surface of said stud finder body.

2. The stud finder device of claim 1, wherein said plurality of wheels disposed on said bottom edge.

3. The stud finder device of claim 2, wherein said plurality of wheels laterally move along a length of said bottom edge.

4. The stud finder device of claim 3, wherein said magnetic sensor disposed in said stud finder body for detecting a pull of said magnet on metal fasteners in a wall stud for indicating a location of the wall stud.

5. The stud finder device of claim 4, wherein said attachment device having a first groove member and an opposing second groove member secured to said protruding wall.

6. The stud finder device of claim 5, wherein said first groove member having a first transversal member affixed to a top edge of said protruding wall and a second transversal member affixed to a bottom edge of said protruding wall.

7. The stud finder device of claim 6, wherein said first transversal member and said second transversal member having a first connecting member therebetween adhering to a first planar surface of said protruding wall.

8. The stud finder device of claim 7, wherein said second groove member having a third transversal member affixed to said top edge of said protruding wall and a fourth transversal member affixed to said bottom edge of said protruding wall.

9. The stud finder device of claim 8, wherein said third transversal member and said fourth transversal member having a second connecting member therebetween adhering to a second planar surface of said protruding wall.

10. The stud finder device of claim 9, wherein said first groove member and said second groove member having an elongated securing arm therebetween, further wherein said elongated securing arm extending through a hollow attachment member of said attachment device enabling lateral movement of said stud finder device along the wall.

11. A stud finder device comprising:
a stud finder body;
a plurality of wheels;
a plurality of stud indication markers;
a magnetic sensor;
a magnet;
a handle; and
an attachment device;
wherein said stud finder body having a top edge, a bottom edge, a pair of side edges, a front surface, and a rear surface;
wherein said plurality of stud indication markers are positioned equidistant along said top edge and across said front surface and said rear surface;
wherein said rear surface having a protruding wall;
wherein said attachment device selectively detachable from said stud finder body;
wherein said handle secured to said protruding wall with said attachment device; and
wherein said stud indication markers are visible from both said front surface and said rear surface of said stud finder body; and
further wherein the handle is a telescoping handle comprising a trigger on one end and a mounting ball at an opposing end for securing the telescoping handle to a socket on the attachment device.

12. The stud finder device of claim 11, wherein said marker assembly having a plurality of pencil markers.

13. The stud finder device of claim 12, wherein said plurality of pencil markers having a first movable graphite pencil marker and a second movable graphite pencil marker.

14. The stud finder device of claim 13, wherein said plurality of wheels laterally move along a length of said bottom edge.

15. The stud finder device of claim 14, wherein said magnetic sensor disposed in said stud finder body for detecting a pull of said magnet on metal fasteners in the wall stud for indicating a location of the wall stud.

16. A method of finding and marking a stud in a wall, the method comprising the step of:
providing a stud finder body, a plurality of wheels, a plurality of stud indication markers, a magnetic sensor, a magnet, a handle, and an attachment device, wherein said stud finder body having a top edge, a bottom edge, a pair of side edges, a front surface, and a rear surface, further wherein said rear surface having a protruding wall;
securing said handle to said protruding wall with said attachment device, wherein said handle having a trigger for actuating a marker assembly for marking a position of a wall stud on the wall;
moving said stud finder body along the wall;
detecting the wall stud in the wall with said magnetic sensor; and
actuating said trigger and said marker assembly for marking a position of the wall stud.

17. The method of finding and marking a stud in a wall of claim 16, wherein said marker assembly having a plurality of pencil markers.

18. The method of finding and marking a stud in a wall stud of claim 17, wherein said plurality of pencil markers having a first movable graphite pencil marker and a second movable graphite pencil marker.

19. The method of finding and marking a stud in a wall stud of claim 18, wherein said magnetic sensor disposed in said stud finder body for detecting a pull of said magnet on metal fasteners in the wall stud for indicating a location of the wall stud.

* * * * *